US008226845B2

(12) United States Patent
Mance et al.

(10) Patent No.: US 8,226,845 B2
(45) Date of Patent: Jul. 24, 2012

(54) IRON POWDER PHOSPHONATE COATING

(75) Inventors: Andrew M. Mance, Royal Oak, MI (US); Keith S. Snavely, Sterling Heights, MI (US); Mark A. Golden, Washington, MI (US); John C. Ulicny, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 898 days.

(21) Appl. No.: 12/259,188

(22) Filed: Oct. 27, 2008

(65) Prior Publication Data

US 2010/0102266 A1 Apr. 29, 2010

(51) Int. Cl.
*C01G 49/08* (2006.01)
*H01F 1/00* (2006.01)

(52) U.S. Cl. .................................. 252/62.56; 252/62.53

(58) Field of Classification Search ............... 252/62.52, 252/62.51 R, 62.53, 62.56
See application file for complete search history.

(56) References Cited

U.S. PATENT DOCUMENTS

| | | | | |
|---|---|---|---|---|
| 4,731,191 | A | 3/1988 | Swihart | |
| 5,505,880 | A * | 4/1996 | Kormann et al. | 252/62.54 |
| 5,916,539 | A * | 6/1999 | Pilgrimm | 424/9.322 |
| 2004/0265348 | A1* | 12/2004 | Hollenberg et al. | 424/401 |
| 2008/0305341 | A1* | 12/2008 | Plieth et al. | 428/419 |

OTHER PUBLICATIONS

Wang et al., "Preparation of Iron Particles Coated with Silica", Journal of Colloid and Interface Science 217, (1999), pp. 203-207.

Belyavskii et al., "Chemical Modification of the Surface of a Carbonyl Iron Powder", Protection of Metals, 2006, vol. 42, No. 3, pp. 244-252.

Yee et al., "Self-Assembled Monolayers of Alkanesulfonic and -phosphonic Acids on Amorphous Iron Oxide Nanoparticles", Langmuir 1999, vol. 15, No. 21, pp. 7111-7115.

Raman et al., "Formation of Self-Assembled Monolayers of Alkylphosphonic Acid on the Native Oxide Surface of SS316L", Langmuir 2006, vol. 22, No. 15, pp. 6469-6472.

* cited by examiner

*Primary Examiner* — Jerry Lorengo
*Assistant Examiner* — Lynne Edmondson
(74) *Attorney, Agent, or Firm* — Dierker & Associates, P.C.

(57) ABSTRACT

A fluid includes a liquid medium having iron particles mixed therein. An organic phosphonate based coating is established on the iron particles. The organic phosphonate based coating does not substantially include phosphonic acid groups at an outer surface thereof, and increases oxidation resistance of the iron particles. A method of making such a liquid medium is also disclosed herein.

12 Claims, 1 Drawing Sheet

IRON POWDER PHOSPHONATE COATING

TECHNICAL FIELD

The present disclosure relates generally to iron powder phosphonate coatings.

BACKGROUND

Magnetorheological (MR) fluids are responsive to magnetic fields and contain a field polarizable particle component and a liquid carrier component. MR fluids are useful in a variety of mechanical applications including, but not limited to, shock absorbers, controllable suspension systems, vibration dampeners, motor mounts, and electronically controllable force/torque transfer devices.

The particle component of MR fluids typically includes micron-sized magneto-responsive particles. In the presence of a magnetic field, the magneto-responsive particles become polarized and are organized into chains or particle fibrils which increase the apparent viscosity (flow resistance) of the fluid, resulting in the development of a solid mass having a yield stress that must be exceeded to induce onset of flow of the MR fluid. The particles return to an unorganized state when the magnetic field is removed, which lowers the apparent viscosity of the fluid.

It is believed that oxidation of the magneto-responsive particles may, in some instances, compromise performance of MR fluids of which they are a component. To date, various attempts have been made to prevent or retard particle oxidation.

SUMMARY

A fluid includes a liquid medium having iron particles mixed therein. An organic phosphonate based coating is established on the iron particles. The organic phosphonate based coating does not substantially include phosphonic acid groups at an outer surface thereof, and increases oxidation resistance of the iron particles.

BRIEF DESCRIPTION OF THE DRAWING

Features and advantages of examples of the present disclosure will become apparent by reference to the following detailed description and drawing.

DETAILED DESCRIPTION

Figure 1:
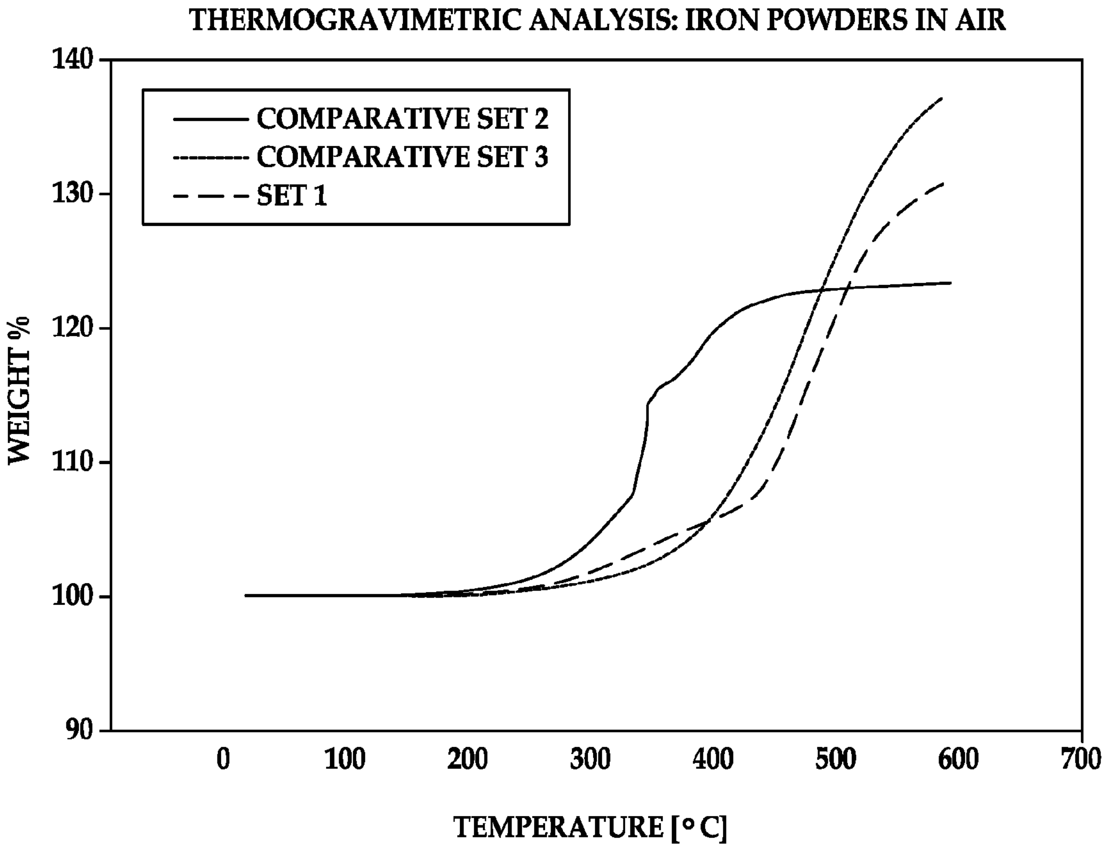
FIG. 1 is a graph depicting the weight gain observed for various iron particles heated through a range of temperatures in air.

Embodiments of the method disclosed herein advantageously result in iron particles having improved corrosion resistance, improved compatibility with organic fluid media (e.g., for use in organic based MR fluids), and improved compatibility with liquid metal media (e.g., for use in metal based MR fluids). The Example discussed hereinbelow illustrates how the coated iron particles disclosed herein advantageously avoid corrosion for at least 9 months, which is orders of magnitude longer than the time it takes other coated iron particles to corrode. As such, it is believed that the iron particles disclosed herein are particularly suitable for use in a variety of MR fluids, at least in part, because they enhance the performance of the MR fluids.

The fluid disclosed herein includes a liquid medium and iron particles mixed in the liquid medium. Non-limiting examples of suitable liquid media include organic based fluids (e.g., those including organic oils, poly-alpha-olefins, mineral oil, silicone oil), liquid-metal based fluids (e.g., gallium, indium, tin and various alloys), and aqueous or polar liquids (e.g., water, glycols, and salt or surfactant solutions thereof). A non-limiting example of an aqueous 30 volume percent iron MR fluid formulation includes treated small particle iron (0.379); treated large particle iron (0.379); fumed silica (0.022); and water (0.219); all of which are shown in weight fractions.

In embodiments in which the organic based fluid or the aqueous liquid is used as the liquid medium, it is to be understood that a surfactant may also be added to the fluid. Suitable surfactants may be ionic (e.g., sodium dodecyl sulfate (SDS), or cetyl trimethylammonium bromide (CTAB)), amphoteric (e.g., dodecyl dimethylamine oxide) or non-ionic (e.g., polysorbates, such as TWEEN® 20 and TWEEN® 80 (both of which are commercially available from ICI Americas, Bridgewater, N.J.), and hydrophilic polyethylene oxides such as TRITON™ X-100 (commercially available from The Dow Chemical Company, Midland, Mich.)). In an example, the surfactant concentration ranges from about $10^{-4}$ to about 1 millimole per liter of solution, or about 0.005 wt % to about 1 wt %.

The iron particles are generally in the form of a powder. A non-limiting limiting example of such a powder is carbonyl iron powder. The iron particles may be small or large, and thus may have any suitable diameter. As a non-limiting example, the average diameter of the particles may range from about 2 microns to about 8 microns. In some instances, small particles (e.g., having an average diameter of about 2 microns) and large particles (e.g., having an average diameter of about 8 microns) may be mixed together in the fluid in a ratio of 50:50 by weight.

The iron particles are exposed to a process which results in the formation of an organic phosphonate based coating established thereon. An additional bake process (described further hereinbelow) is believed to substantially remove phosphonic acid groups from the surface of the organic phosphonate based coating; as such, the organic phosphonate based coating does not substantially include phosphonic acid groups (i.e., the number of phosphonic acid groups remaining is less than about 5% of the coating).

The bake process is believed to heat the iron completely in order to drive the formation of water from the Fe═O, Fe—OH, and P—OH groups on the surface. As a result, once the OH groups are reacted and driven off as water, P—O—Fe and P—O—P groups remain in the coating. It is believed that over 95% of the surface Fe—OH groups are reacted with the P—OH groups, which are converted at a level of over 95% to P—O—Fe units.

In preparing the coating, the iron particles are first soaked in an organic solvent containing a phosphonic acid derivative. The phosphonic acid derivative has the formula (O═)P(R)$(OH)_2$, where R is selected from phenyl groups (e.g., $—C_6H_5$); substituted phenyl groups; alkyl groups (straight chained (e.g., n-octyl) or branched (e.g., 2-ethylhexyl); aryl groups; ether groups; any group containing alkyl and/or aryl functionality; any alkyl or aryl group containing a pendant alkene or alkyne; lauryl groups; stearyl groups; tallow groups; any group containing an unsaturated reactive group (non-limiting examples of which include vinyl groups (e.g., vinyl phosphonic acid) or dienes (e.g., butadiene phosphonic acid)); and combinations thereof.

Generally, the organic solvent(s) is/are selected based on their ability to dissolve the phosphonic acid compound without promoting reactions between the iron and the acid group of the phosphonic acid derivative. Solvents which do not contain substantial amounts of water (i.e., less than 0.5% by weight) may be desirable. High water content creates a low pH environment in which the acid groups will oxidize the iron surface. As such, polar organic compounds may be particularly desirable. Non-limiting examples of suitable solvents include those containing an ether group, such as diethyl ether, dimethoxy ethane, or tetrahydrofuran (THF). Ether containing solvents with lower volatility and a higher molecular weight may also be used. Examples of such ether containing solvents include derivatives of ethylene glycol, such as triethylene glycol dimethyl ether. Other polar solvents, such as organic carbonates (e.g., propylene carbonate, ethylene carbonate, diethyl carbonate) may also be used. It is to be understood, however, that the combination of phosphonic acid and carbonate should be selected (in addition to maintaining a low moisture content) to avoid potentially deleterious reactions. Phosphoric acid esters (such as triethyl phosphate (TEP)) may also be employed provided trans esterification reactions do not occur.

As a non-limiting example, the phosphonic acid derivative is phenyl phosphonic acid (PPPA), and the organic solvent is tetrahydrofuran (THF).

As mentioned above, it is advisable to use solvents which do not contain substantial amounts of water (less than 0.5% by weight). High water content will create a low pH environment in which the acid groups will oxidize the iron.

After the particles soak for a predetermined time (e.g., between 30 minutes and 120 minutes, depending, at least in part on the particles used, the solvent used, etc.), the organic solvent is removed. In an embodiment, the iron particles are then rinsed and dried. Rinsing may be accomplished to remove unreacted phosphonic acid. The rinsing may be accomplished by exposing the particles to a solvent other than water that dissolves any remaining phosphonic acid derivative. It is believed that water may react with the P—OH groups and undesirably turn into a highly reactive acidic solution. Any of the previously described solvents may be used for rinsing. Another suitable rinsing solvent includes 2-propanol, or a solvent with a lower vapor pressure than 2-propanol. Multiple rinsing steps may be utilized. The rinsed particles may then be exposed to pentane, or some other rapidly evaporating liquid, to assist in drying of the particles, to remove the less volatile solvents, and to reduce exposure of the particles to moisture. It is to be understood that in some instances, a pentane rinse may not be desirable.

The iron particles are then heated to a first predetermined temperature in an atmosphere that is substantially free of molecular oxygen. Non-limiting examples of such atmospheres include nitrogen, argon, helium, carbon monoxide (CO), hydrogen gas ($H_2$), carbon dioxide ($CO_2$), or any other suitable molecular, oxygen free atmosphere. The first predetermined temperature is determined, at least in part, by the requirements to drive the formation of water from the —OH and, to a lesser extent, the ═O groups on the iron particle surface and then remove it as a gas (vapor). It is believed that this may be accomplished at a temperature over 110° C., for example, at about 140° C.

It is to be understood that the temperature to which the iron particles are exposed may be ramped up to the first predetermined temperature in order to remove any remaining bulk solvent molecules. For example, the particles may be preheated (e.g., at about 60° C.) to remove most of the organic solvent(s), then the temperature may be ramped up under vacuum to remove the rest of the solvent(s), and then the final temperature (i.e., the first predetermined temperature) is achieved and maintained for a predetermined time period in order to condense water from the acid groups and form a stable surface. The time for particle exposure at the first predetermined temperature may depend, at least in part, on how much of the particle's area is exposed. For example, if the iron particles are a stationary pile of material, then time is required for the water vapor to diffuse to the surface then get carried out. As another example, when a heated batch of iron particles can be mixed under vacuum, less exposure time is necessary. After heating at the first predetermined temperature for a desirable time period, the iron particles are cooled to ambient temperature in the molecular oxygen free atmosphere.

The iron particles are then reheated to a second predetermined temperature for a predetermined time to initiate a condensation reaction between a hydroxyl group of the phosphonic acid derivative and a surface of each of the iron particles. This reaction results in the phosphonic acid derivative reacting with hydroxyl groups (and possibly some oxide groups) on a surface of the iron particles, and then forming bonds to the surface.

The post bake or reheating of the iron particles may be accomplished under vacuum, in an inert atmosphere, or combinations thereof. The post bake may be accomplished under vacuum. Generally, reheating is initiated without vacuum, and vacuum is introduced as the temperature of the vacuum oven is raised. In one embodiment, the temperature of the vacuum oven is held at about 50° C. for a portion of the predetermined time (and, for example, no vacuum is applied), and then the temperature is increased to the second predetermined temperature (and, for example, vacuum is applied). The particles are heated at this post bake temperature for a remainder of the predetermined time. The second predetermined temperature generally ranges from about 110° C. to about 200° C.

The time of the post bake may depend, at least in part, on the thickness of the iron particles (i.e., the depth of the material) at the bottom of the container holding such particles. For example, baking more particles will generally require more time because the water has to diffuse from the lower levels. However, if the thick layer is exposed to a hot inert gas flowing through it from below, the bake time may be less. As other examples, baking with stirring, having the powder fall through a hot, inert gas, or mixing the particles under vacuum may each require less time to achieve the desirable reaction. In one example, the predetermined time of the reheating or post bake ranges from about 10 minutes to about 24 hours. It is to be understood that this time may be adjusted in order to achieve the desirable coated iron particles.

As previously mentioned, the reheating process may be accomplished in an inert atmosphere, such as argon or nitrogen, or an atmosphere void of water and oxygen. It is contemplated that reheating may also be accomplished in a stirred, hot oil bath.

The resulting coating is generally a thin, continuous layer. The thickness of the coating is on the order of a monolayer, and the continuity of the coating is substantially unbroken and uniform. The coating is hydrophobic and alters the polarity of the iron particle surface. This substantially improves the wetting towards organic oils and some liquid metals. The coating also acts as a barrier, for example, towards water, on the surface of the iron particle.

The coated particles are then cooled to ambient temperature under vacuum. After being cooled, the organic phosphonate based coated iron particles are incorporated into one of the previously mentioned liquid media in a desirable amount to form an MR fluid.

To further illustrate the embodiment(s) disclosed herein, the following examples are given. It is to be understood that these examples are provided for illustrative purposes and are not to be construed as limiting the scope of the embodiments disclosed herein.

EXAMPLE 1

Two sets of coated particles were formed. One set (Set A) was exposed to the post bake process disclosed herein, and the other set (Comparative Set B) was not exposed to the post bake process disclosed herein. The coated particles of Set A were compared to those of Comparative Set B and to the as-received (untreated) iron particles.

Both Sets A and B included 500 g of a 1% solution of phenyl phosphonic acid (PPPA) in tetrahydrofuran (THF) and 300 g of an as-received iron powder. The solution and iron particles were placed in plastic bottles, and the bottles were rotated, on a mixer, for one hour. The iron powder was then allowed to settle in each of the bottles, and the THF was poured off. Excess PPPA was removed by first rinsing with THF. While not utilized in this Example, it is also believed that an initial ether rinse also minimizes the chances of reactions between excess acid and the iron surfaces. In this Example, additional rinsing was accomplished by adding 2-propanol to the bottles, shaking, allowing the iron particles to settle, and then pouring off the 2-propanol. This was repeated so that the iron particles were rinsed three times with 2-propanol. In order to promote drying and minimize exposure to moisture, the iron particles were then rinsed in the same manner with pentane (three rinses), then placed in respective glass beakers. The beakers were put onto a hot plate (60° C.), and dry nitrogen gas was passed over the beakers for 2 hours. The beakers were then allowed to cool to room temperature, and nitrogen gas was passed over the iron particles for 16 more hours to remove remaining solvent residues. The iron particles of Comparative Set B were not subject to any additional treatment. The iron particles of Comparative Set B rapidly corroded (within seconds (e.g., a few seconds)) when exposed to water.

The coated iron particles of Set A were put in a vacuum oven (approx. 700 mm Hg) and held at 50° C. for one hour, and then were heated to 150° C. for 8 hours. The 150° C. treatment was performed in order to promote a condensation reaction between the hydroxylated surface of the iron particles and the —OH groups of the phosphonic acid derivative.

The coated iron particles of Set A were added to liquid gallium. These particles did not corrode and did not alloy or phase separate from the gallium at 80° C. The as-received iron particles were also added to liquid gallium. The untreated, as-received iron particles formed an alloy with gallium, and as such, a combination of these two metals is unacceptable for use in a liquid metal MRF.

When the as-received iron particles were mixed with gallium metal (combined in a 1:1 ratio), corrosion was noted on the surface of the mixing vessel. No such corrosion was noted with the phosphonate treated iron of Set A mixed with gallium metal. A 1:1 ratio of treated iron particles and gallium was compounded and then heated, in air, to 80° C. for 24 hours. No corrosion was observed. Furthermore, no separation of the iron and gallium into separate phases was observed after 24 hours. As such, the coating described herein prevented the alloying of the gallium and iron, which turns the mixture into a solid when it is heated to 80° C. for a few hours. Without such a coating (Set A), the mixture of iron and gallium is not usable as an MR fluid at elevated temperatures.

In order to test the corrosion resistance of the iron particles of Set A, a corrosion test was performed. Some of the coated iron particles of Set A were dispersed in water, and the water mixture was continuously exposed to air. Due to evaporation, water was occasionally added. The coated particles showed no visual sign of corrosion after over 9 months in water compared to the as-received iron particles (which were not treated at all). The as-received iron particles were similarly added to water, however these particles substantially corroded (noted by an orange appearance) within three days.

Casual observation has indicated that the coated iron particles of Set A interact (wet) more readily than the as-received iron particles when exposed to organic liquids such as xylene and tetrahydrofuran (THF).

EXAMPLE 2

Two sets (labeled and referred to as Comparative Sets 2 and 3) of untreated iron particles were compared with a set of particles (labeled and referred to as Set 1) that were formed and treated similarly to Set A in Example 1. The untreated particles of Comparative Set 2 were small particles having an average diameter of about 2 microns, and the untreated particles of Comparative Set 3 were large particles having an average diameter of about 8 microns. The treated particles of Set 1 included both small and large particles mixed together in a ratio of about 50:50 by weight.

The treated (Set 1) and untreated (Comparative Sets 2 and 3) particles were subjected to thermogravimetric analysis in air. The results are shown in FIG. 1. More specifically, FIG. 1 is a plot of the weight gain observed when the various iron particles were heated through a range of temperatures in air in a thermogravimetric analyzer (TGA). The temperature ramp was a 10° C. per minute linear ramp. The weight gain is indicative of the oxidation of the iron as it combines with the oxygen in the air. As such, FIG. 1 generally shows that the phosphonate-treated iron particles (Set 1) oxidize more slowly in air than the untreated iron (Comparative Sets 2 and 3). Furthermore, FIG. 1 illustrates that the phosphonate-treated iron particles (Set 1) oxidize much more slowly than the small particle iron of Comparative Set 2. The oxidation of the small particle iron of Comparative Set 2 is responsible for a large part of the loss of magnetic yield stress of the MR fluid in which it is incorporated due to the relatively rapid oxidation of the small particles which is, in turn, due to their relatively high surface area to volume ratio. Due to the relatively low surface area of Comparative Set 3 as compared to Comparative Set 2, the particles in Comparative Set 3 oxidize more slowly than the particles in Comparative Set 2. It is believed that the phosphonate coating disclosed herein advantageously protects against oxidation, at least in part because it blocks active surface sites on the iron particles. This is supported via, e.g., the comparison of Set 1 and Comparative Set 2, particularly at higher temperatures.

While several embodiments have been described in detail, it will be apparent to those skilled in the art that the disclosed embodiments may be modified. Therefore, the foregoing description is to be considered exemplary rather than limiting.

The invention claimed is:

1. A fluid, comprising:

a liquid medium;

iron particles mixed in the liquid medium; and an organic phosphonate based coating established on the iron particles, the organic phosphonate based coating having been formed from a phosphonic acid derivative having the formula $(O{=})P(R)(OH)_2$ and having been exposed to a heating process which forms the coating having less than 5% of phosphonic acid groups at an outer surface thereof, and wherein the organic phosphonate based coating increases oxidation resistance of the iron particles.

2. The fluid as defined in claim 1 wherein R of the phosphonic acid derivative is selected from phenyl groups; substituted phenyl groups; alkyl groups; aryl groups; ether groups; any group containing alkyl and aryl functionality; any alkyl or aryl group containing a pendant alkene or alkyne; lauryl groups; stearyl groups; tallow groups; any group containing an unsaturated reactive group; and combinations thereof.

3. The fluid as defined in claim 2 wherein the organic phosphonate based coating is formed as a result of a condensation reaction between a surface of the iron particles and the phosphonic acid derivative.

4. The fluid as defined in claim 1 wherein the organic phosphonate based coating reacts with hydroxyl groups on a surface of the iron particles.

5. The fluid as defined in claim 1 wherein the organic phosphonate based coating is configured to at least one of improve corrosion resistance of the iron particles or improve compatibility of the iron particles with the liquid medium.

6. The fluid as defined in claim 1 wherein the organic phosphonate based coating alters a polarity of a surface of the iron particles.

7. The fluid as defined in claim 1 wherein the organic phosphonate based coating is hydrophobic.

8. The fluid as defined in claim 1 wherein the liquid medium is selected from an organic based fluid, a liquid-metal based fluid, and an aqueous liquid.

9. The fluid as defined in claim 8 wherein the aqueous liquid or the organic based fluid is the liquid medium, and wherein the fluid further comprises a surfactant.

10. The fluid as defined in claim 1 wherein the organic phosphonate based coating is a thin continuous layer.

11. The fluid as defined in claim 4 wherein the organic phosphonate based coating includes —P—O—Fe and —P—O—P— groups, and wherein the coating includes over 95% —P—O—Fe groups.

12. The fluid as defined in claim 1 wherein the iron particles have an average diameter ranging from about 2 microns to about 8 microns.

* * * * *